April 30, 1929.  E. M. BROGDEN  1,710,682
FRUIT WASHING APPARATUS
Original Filed July 12, 1924  2 Sheets-Sheet 2

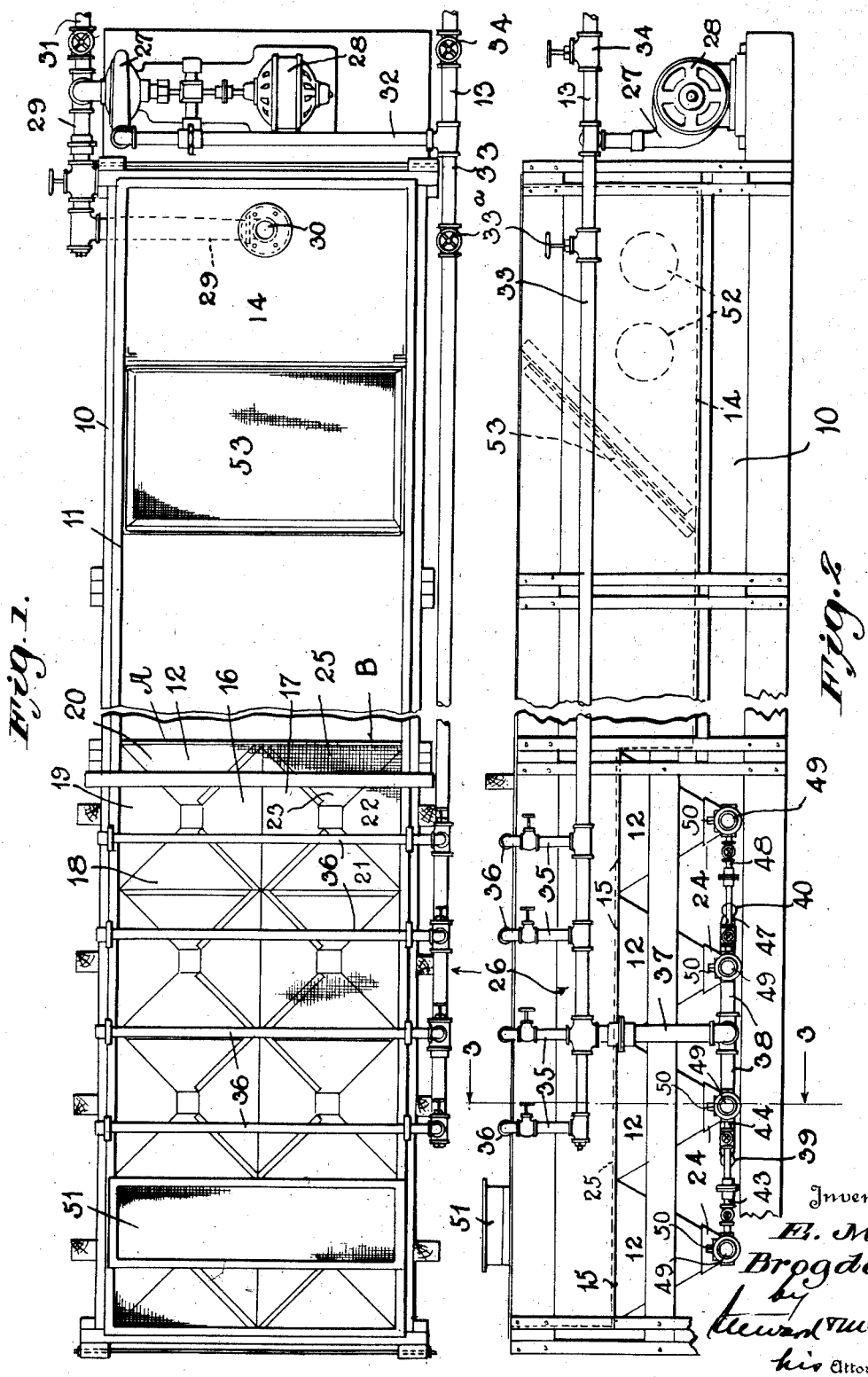

E. M. Brogden, Inventor

By Steward McKay
his Attorneys

Patented Apr. 30, 1929.

1,710,682

UNITED STATES PATENT OFFICE.

ERNEST M. BROGDEN, OF SANTA MONICA, CALIFORNIA, ASSIGNOR TO BROGDEX COMPANY, OF WINTER HAVEN, FLORIDA, A CORPORATION OF FLORIDA.

FRUIT-WASHING APPARATUS.

Application filed July 12, 1924, Serial No. 725,672. Renewed November 26, 1926.

The invention relates to fruit washing apparatus and in particular it relates to receptacles or tanks adapted to contain a liquid for washing or soaking fruit, especially citrus fruit, such as oranges, lemons, grapefruit and tangerines. The term "fruit" as used throughout the specification and claims includes not only fruit proper, but also vegetables and similar food stuffs and where, for convenience, any particular fruit is referred to, it is to be understood that such reference is to fruit broadly.

Fruit, as it comes from the grover, is frequently covered with dirt and other undesirable foreign matter. In order to remove such dirt, the fruit is dumped into tanks or containers filled with water, where it remains for a certain period of time, after which the fruit is subjected to a brushing operation. Some of the dirt is loosened and remains in the tank, the rest being removed by the brushing.

The wash water ordinarily becomes very dirty a short while after fruit is run through it, especially if the fruit being washed is very dirty, and this requires constant changing or renewing of the wash water.

Under certain conditions, it is desirable to use warm water for washing the fruit and when warm water is used, it is desirable to circulate the water, especially if the tank is provided with means for heating the water, in order to maintain the wash water at an even temperature throughout the tank.

An object of this invention is to provide a tank of the character described having means for quickly renewing or changing the washing fluid.

Another object of the invention is to provide a tank from which dirt and dirty water can be discharged without draining off comparatively clean water.

A further object of the invention is to provide a tank in which the washing fluid can be circulated.

Other objects and features of the invention will be obvious from the following description taken in conjunction with the accompanying drawings which illustrate one specific embodiment of the invention, but it is to be understood that the invention is not limited to the particular construction illustrated and described.

Referring to the drawings,

Fig. 1 is a top plan view of apparatus embodying the invention,

Fig. 2 is a side elevational view,

Figure 3:
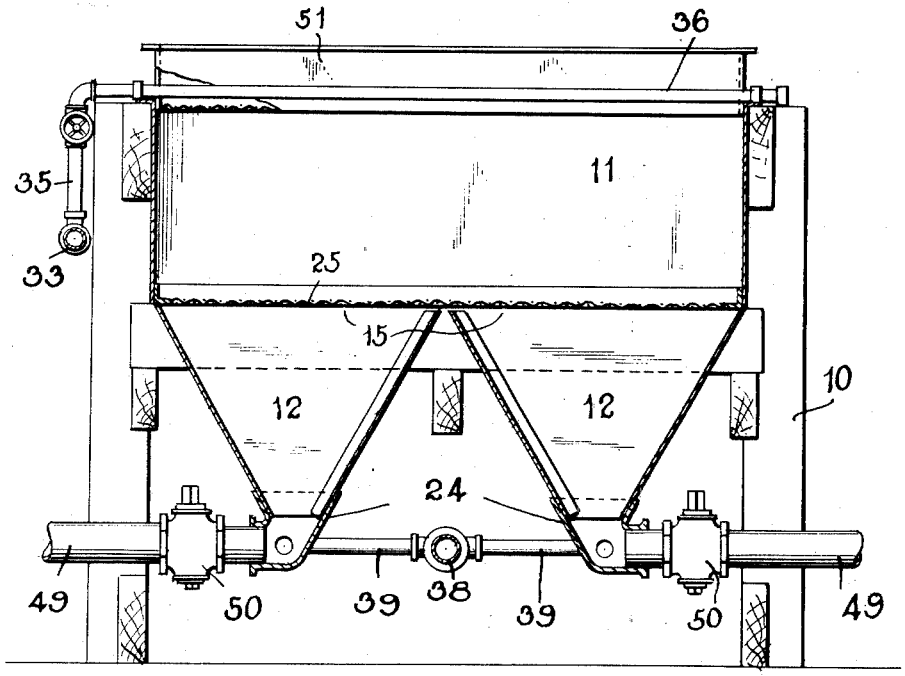
Fig. 3 is a sectional view taken on the line 3—3 of Fig. 2 looking in the direction of the arrows.
Figure 4:
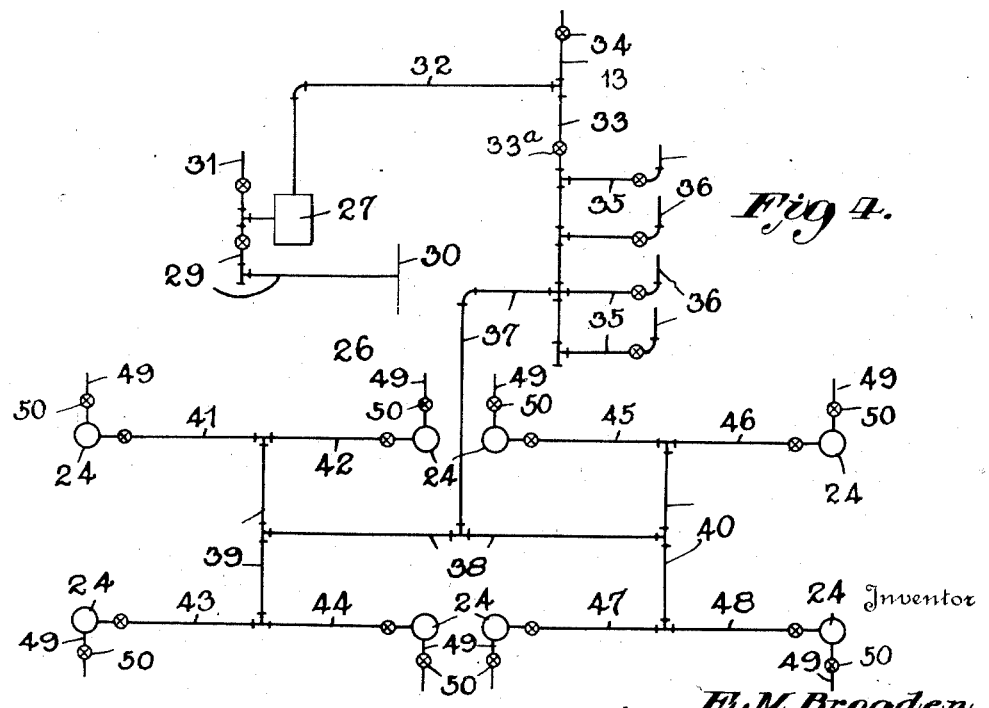
Fig. 4 is a diagrammatic view of the piping system, the spray pipes being shown slightly out of place for the sake of clearness.

In the drawings, 10 indicates a framework which supports a receptacle or tank indicated generally by 11. A portion of the bottom of tank 11 is formed to provide a plurality of catch basins or settling pockets 12 located at one end of the tank, the bottom of the tank at the other end being substantially plane as indicated at 14, said plane bottom being located below the level of the mouths 15 of the tapering pockets or hoppers 12. In the present instance, the pockets or hoppers 12 are substantially of inverted pyramidical shape, with the edges of the rectangular mouths of adjacent pockets or hoppers adjoining one another, although it is to be understod that the pockets or hoppers can be of any suitable shape and construction. In the present instance a pair of hoppers is made of three blanks or pieces of sheet metal. As shown in Fig. 1 the two end hoppers A and B nearest the center of the tank are made of (1) a piece of metal bent to form faces or sides 16 and 17; (2) a piece of metal bent to form sides or faces 18, 19 and 20 of hopper A; and (3) a piece of sheet metal bent to form sides or faces 21, 22 and 23 of hopper B. The sides or faces of each of the hoppers extend into or fit in the flared end of an elbow or casting 24, elbows 24 forming bottoms or outlets for the hoppers. The mouths 15 of the hoppers 12 are all substantially in the same plane and are covered with a screen 25. A piping system indicated generally by 26 in which is connected a pump 27 is provided in order to permit liquid in the tank to be circulated and also to permit filling and emptying of the tank. Pump 27, which may be driven by any suitable means such as electric motor 28, has its suction side connected by piping 29 to an opening 30 in the plane bottom 14 of the tank 11, the suction or intake of the pump being also connected by piping 31 leading to a fresh water suply. Both pipes 29 and 31 are valved so that the pump can suck liquid either from tank 11 or from the fresh water supply or both, depending upon the setting of the valves. The discharge from pump 27 is connected by a pipe 32 to a pipe 33 which in the present instance extends longitudinally of the tank 11. One end 13 of longitudinal pipe 33 is connected by suitable piping to a fruit brushing and washing machine (not shown), the flow of liquid being controlled by valve 34. The other end of longitudinal pipe 33 provided with valve 33ª has a plurality of valved branches 35 leading to spray pipes 36 which extend transversely of tank 11 and over hoppers 12. Another branch 37 of longitudinal pipe 33 leads to a pipe 38 which extends underneath the tank and centrally and longitudinally of the valved bottoms or outlets 24 of hoppers 12, this pipe 38 being in turn connected to branch pipes 39 and 40, (see Fig. 4) branch pipes 39 and 40 being connected to valved pipes 41, 42, 43, 44 and 45, 46, 47, 48, respectively, which open into, or are connected to, elbows or bottoms 24 of hoppers 12. As shown in Fig. 3, each elbow or casting 24 forming the bottom of a hopper 12 is connected with a waste pipe 49 controlled by a valve 50. By opening the valves 50, the contents of each of the hoppers can be emptied or drained.

A screen box 51 is provided to receive the excess washing fluid returned from the brush washing machine by a pipe (not shown) and heaters 52 are provided for heating the washing fluid, an inclined screen 53 being provided to prevent fruit from getting too close to the heaters.

In filling the tank, water from any suitable supply is admitted to the tank through pipes 29 and 31, the water entering the tank through opening 30. In this case the pump is not operated, it being assumed that there is sufficient water pressure to make operation of the pump unnecessary. However, if the water will not run into the tank under its own pressure, pump 27 may be used in filling the tank. In this case the valve in pipe 29 should be closed, the pump sucking water through pipe 31 and delivering it through pipes 32, 33, and pipes 37 to 48, inclusive, to the bottoms of hoppers 12. Water can also be admitted through pipes 35 and sprays 36 if desired. The tank is filled with liquid to within a short distance from the top of the tank, the liquid covering the mouths 15 of hoppers 12. As soon as the tank is filled, the valve in pipe 31 leading to the fresh water supply is closed and the valve in pipe 29 leading to the opening 30 in the bottom of the tank is opened, pump 27 thereby maintaining a constant circulation of water in the tank. If it is desired to warm the water, the heaters 52 are turned on. Fruit to be washed is dumped into the tank directly over the mouths 15 of hoppers 12. The fruit gradually floats to the other end of the tank, being subjected to sprays coming from spray pipes 36, the thoroughly wetted fruit finally reaching an endless conveyor (not shown), one end of which extends into the tank adjacent inclined screen 53. The conveyor delivers the thoroughly wetted fruit to a brush roll washer of any suitable type. Pump 27 delivers washing fluid through a pipe 13 to the brush roll washer, the excess fluid being returned by a pipe (not shown) to the tank 10 through screen box 51. If desired, the circulation of the fluid in the tank can be stopped by closing the valves in pipes 41 to 48 inclusive. This is frequently desirable, especially when the fluid in the tanks gets very dirty because after the circulation of the water has stopped, dirt and other sediment will fall to the bottom and can be removed by opening valves 50 in the bottoms of the hoppers 12, permitting the dirt and dirty water to be discharged through waste pipes 49. When the water is not being circulated, the dirt which comes off the fruit entering the hopper end of the tank will tend to settle in the hoppers instead of contaminating the water in the rest of the tank and by opening valves 50 this dirt can be discharged from the tank without discharging the cleaner water at the top of the tank. Water coming from spray pipes 36 tends to loosen and remove dirt from the fruit floating under these sprays and this dirt will tend to settle in the hoppers from which it can be easily removed instead of mixing with the water in the rest of the tank. When it is desired to drain the tank, the water can be discharged through valved bottoms 24 and opening 30. It will be seen that in a tank as described above, dirt and dirty water can be separated from the cleaner water and can then be discharged from the tank without draining off the cleaner water and this can be done without interfering in any way with the washing of fruit. Not only does this result in a saving of time, but it also results in a saving of washing fluid. This last mentioned advantage is of particular importance where the water supply is limited or in cases where, instead of using merely water, an aqueous solution of a treating agent is used for washing and treating the fruit because in such a case it is of course desirable, on account of the expense involved, to use as little of the solution as is possible.

What is claimed is:

1. Apparatus for washing fruit comprising a receptacle supplied with washing fluid, said receptacle divided to provide a main compartment having a substantially plane bottom and a plurality of adjoining auxiliary compartments formed to provide a plurality of pyramidical settling pockets having imperforate walls, the mouths of said settling pockets being above the level of the bottom of the main compartment.

2. Apparatus for washing fruit comprising a receptacle supplied with washing fluid, said receptacle having sides, ends, and a bottom, part of said bottom being substantially plane and the other part formed to provide a plurality of tapering pockets or hoppers having imperforate walls, the mouths of said pockets or hoppers being located above the level of the plane portion of the bottom, but below the normal level of the fluid in said receptacle.

3. Apparatus for washing fruit comprising a receptacle supplied with washing fluid, said receptacle having sides, ends, and a bottom, part of said bottom being substantially plane and the other part formed to provide a plurality of tapering settling pockets or hoppers having imperforate walls, the mouths of said pockets or hoppers being located above the level of the plane portion of the bottom.

4. Apparatus for washing fruit comprising a receptacle supplied with washing fluid, said receptacle having a bottom, part of which is substantially plane and the other part formed to provide a plurality of tapering settling pockets or hoppers having imperforate walls each provided with a rectangular mouth, the mouths of the pockets or hoppers being located above the level of such plane portion, said pockets or hoppers arranged adjacent one another with the edges of the mouths of adjacent pockets or hoppers adjoining one another.

5. Apparatus for washing fruit comprising a receptacle supplied with washing fluid, said receptacle having a bottom comprising a substantially plane portion and a portion formed to provide a plurality of tapering settling pockets or hoppers arranged so that the mouths of said pockets or hoppers are substantially in a common plane, the plane of said mouths being above the level of the plane portion of said bottom, and a screen covering said mouths.

6. Apparatus for washing fruit comprising a receptacle supplied with washing fluid, said receptacle having a bottom, part of which is substantially plane and part formed to provide a plurality of pyramidical settling pockets having imperforate walls and each provided with a rectangular mouth, said pockets arranged adjacent one another so that the mouths of said pockets are substantially in a common plane, the edges of the mouths of adjacent pockets adjoining one another, the bottoms of said pockets being provided with means for admitting or discharging fluid at will.

7. Apparatus for washing fruit comprising a receptacle supplied with fluid, said receptacle provided with a plurality of tapering settling pockets or hoppers having imperforate walls, the bottoms of said pockets or hoppers provided with means for admitting or discharging fluid at will.

8. Apparatus for washing fruit comprising a receptacle supplied with fluid, said receptacle having a bottom, part of which is substantially plane and the other part formed to provide a plurality of settling hoppers having imperforate walls, the plane part of the bottom and the settling hoppers each provided with a valved opening, and means for admitting or discharging fluid through such openings at will.

9. Apparatus for washing fruit comprising a receptacle supplied with washing fluid, said receptacle having a bottom, the fruit to be washed adapted to enter at one end and leave at the other end of said receptacle, the bottom of the receptacle at the end adapted to receive the fruit being formed to provide a plurality of tapering settling pockets or hoppers having imperforate walls, the bottom at the other end of the receptacle being substantially plane and located below the level of the mouths of said settling pockets or hoppers.

10. Apparatus for washing fruit comprising a receptacle supplied with washing fluid, said receptacle having a bottom, part of which is substantially plane and the other part formed to provide a plurality of tapering pockets or hoppers having imperforate walls, the plane portion of the bottom and the tapering pockets or hoppers each provided with a valved opening, and means including a pump and piping connected to said openings for positively maintaining a circulation of fluid in said receptacle.

11. Apparatus for washing fruit comprising a receptacle supplied with fluid, said receptacle being divided into a main compartment and auxiliary compartments and being provided with a plurality of settling pockets, each of said pockets being provided with a valved discharge opening, spray means located above said settling pockets, and means for circulating the fluid in said receptacle.

12. Apparatus for washing fruit comprising a receptacle supplied with fluid, said receptacle being provided with a plurality of settling pockets each having a valved bottom, and spray means located above said settling pockets.

13. Apparatus for washing dirt from articles comprising a receptacle divided into two interconnected compartments into which fluid for washing the articles may be introduced to a depth sufficient whereby the articles may be freely floated or conveyed by the fluid from one of said compartments to the other, one of said compartments providing a washing and settling chamber having a plurality of pockets into which the dirt from the articles is received, means for opening the bottom of said pockets for withdrawing the dirt or draining the fluid therefrom, and the other of said compartments providing a reservoir the bottom of which compartment is below the upper portions of the pockets in the washing compartment whereby the fluid may be drained from the pockets in the washing compartment without withdrawing a substantial amount of fluid from the reservoir compartment.

14. In the combination with the washing receptacle according to claim 13, means for circulating the fluid in said receptacle effective to withdraw it from the reservoir compartment and feed it to the washing compartment whereby the fluid is caused to flow from the washing compartment and convey articles introduced therein to the reservoir compartment.

15. In combination with the washing receptacle according to claim 13, a fluid circulating pump, a spray device over the washing compartment of the receptacle, and fluid conductors connected between the reservoir compartment said pump and said spray device, whereby the fluid in the receptacle may be fed to said spray device for washing the articles introduced therein and effect a flow of fluid from said washing chamber to said reservoir for conveying articles introduced in the washing chamber to the reservoir.

16. In combination with the washing receptacle according to claim 13, a fluid circulating pump, a spray device over the washing compartment of the receptacle, and fluid conductors connected between the reservoir compartment said pump and said spray device, whereby the fluid in the receptacle may be fed to said spray device for washing the articles introduced therein and effect a flow of fluid from said washing chamber to said reservoir for conveying articles introduced in the washing chamber to the reservoir, and conveyor means for withdrawing the articles from said reservoir.

In testimony whereof I hereunto affix my signature.

ERNEST M. BROGDEN.